No. 12,061. Reissued Dec. 2, 1902.

T. & W. L. COLE.

APPARATUS FOR PRODUCING COLD AIR FOR REFRIGERATING OR LIKE PURPOSES.

(Application filed July 12, 1901.)

6 Sheets—Sheet 1.

Witnesses:
C. D. Kesler
F. B. Kelly

Inventors
Thomas Cole
William L. Cole
By James L. Norris
Atty

No. 12,061. Reissued Dec. 2, 1902.

T. & W. L. COLE.

APPARATUS FOR PRODUCING COLD AIR FOR REFRIGERATING OR LIKE PURPOSES.

(Application filed July 12, 1901.)

6 Sheets—Sheet 2.

Witnesses:
C. D. Kesler
J. B. Tuttle

Inventors
Thomas Cole
William L. Cole
By James L. Norris
Atty

No. 12,061. Reissued Dec. 2, 1902.

T. & W. L. COLE.

APPARATUS FOR PRODUCING COLD AIR FOR REFRIGERATING OR LIKE PURPOSES.

(Application filed July 12, 1901.)

6 Sheets—Sheet 3.

Witnesses:
C. D. Kesler
[signature]

Inventors
Thomas Cole
William L. Cole
By James L. Norris
Atty

No. 12,061. Reissued Dec. 2, 1902.
T. & W. L. COLE.
APPARATUS FOR PRODUCING COLD AIR FOR REFRIGERATING OR LIKE PURPOSES.
(Application filed July 12, 1901.)
6 Sheets—Sheet 4.
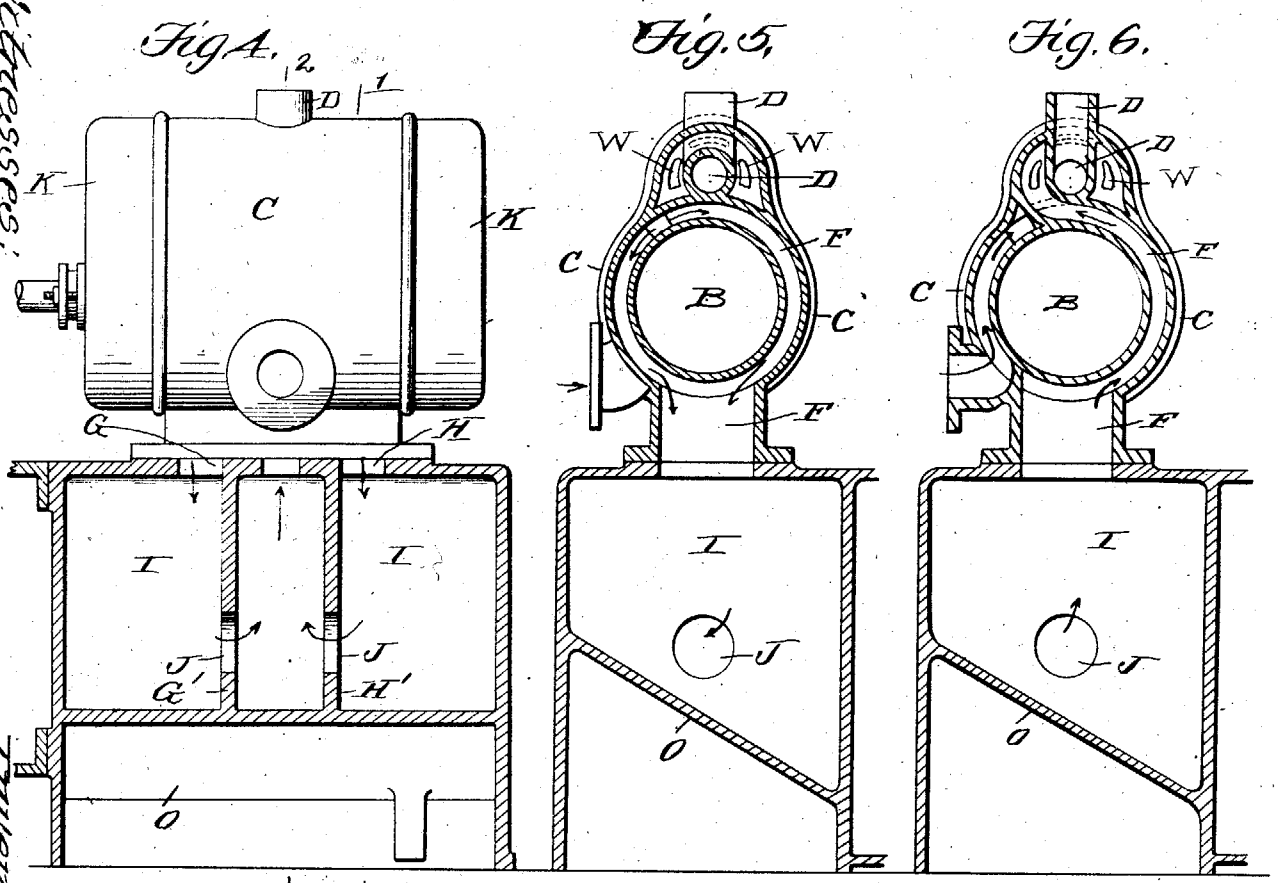
Witnesses:
Ch. D. Keslor
J. B. Keefer
Inventors
Thomas Cole
William L. Cole
By James L. Norris
Atty No. 12,061. Reissued Dec. 2, 1902.
T. & W. L. COLE.
APPARATUS FOR PRODUCING COLD AIR FOR REFRIGERATING OR LIKE PURPOSES.
(Application filed July 12, 1901.)
6 Sheets—Sheet 5.
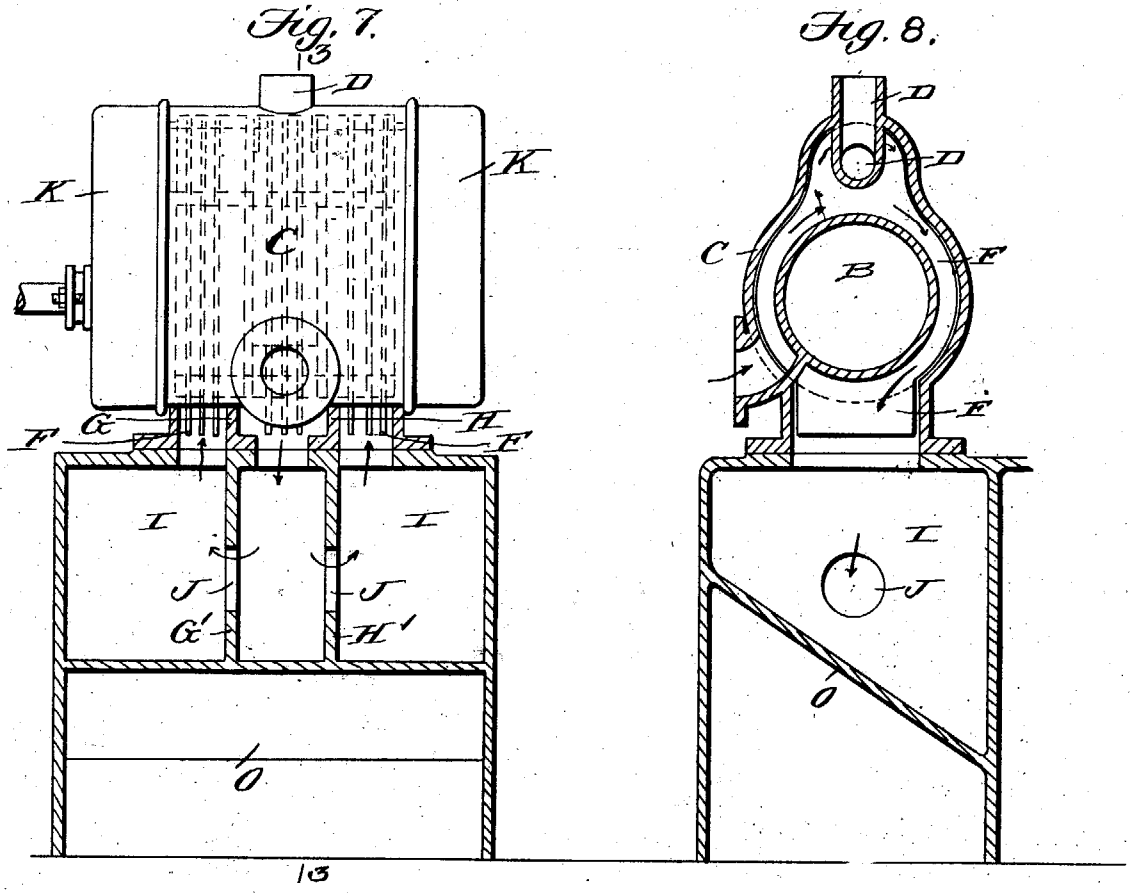
Witnesses:
C. S. Kesler
J. B. Keefer
Inventors
Thomas Cole
William L. Cole
By James L. Norris
Atty No. 12,061. Reissued Dec. 2, 1902.

T. & W. L. COLE.

APPARATUS FOR PRODUCING COLD AIR FOR REFRIGERATING OR LIKE PURPOSES.

(Application filed July 12, 1901.)

6 Sheets—Sheet 6.

Witnesses:
C. D. Kesler.
[illegible]

Inventors
Thomas Cole
William L. Cole
By James L. Norris
Atty.

UNITED STATES PATENT OFFICE.

THOMAS COLE AND WILLIAM LAWES COLE, OF LONDON, ENGLAND.

APPARATUS FOR PRODUCING COLD AIR FOR REFRIGERATING OR LIKE PURPOSES.

SPECIFICATION forming part of Reissued Letters Patent No. 12,061, dated December 2, 1902.

Original No. 663,731, dated December 11, 1900. Application for reissue filed July 12, 1901. Serial No. 68,109.

*To all whom it may concern:*

Be it known that we, THOMAS COLE and WILLIAM LAWES COLE, citizens of the Kingdom of Great Britain, residing at London, England, have invented certain new and useful Improvements in Apparatus for Producing Cold Air for Refrigerating or Like Purposes, (for which Letters Patent of the United States No. 663,731 were granted the 11th day of December, 1900, to us, and which are herewith surrendered for reissue,) of which the following is a specification.

This invention relates to certain improvements connected with apparatus for producing cold air for refrigerating and like purposes.

Our invention will be clearly understood from the following description, aided by the accompanying drawings, in which several examples of carrying our invention into practice are shown.

Figure 1:
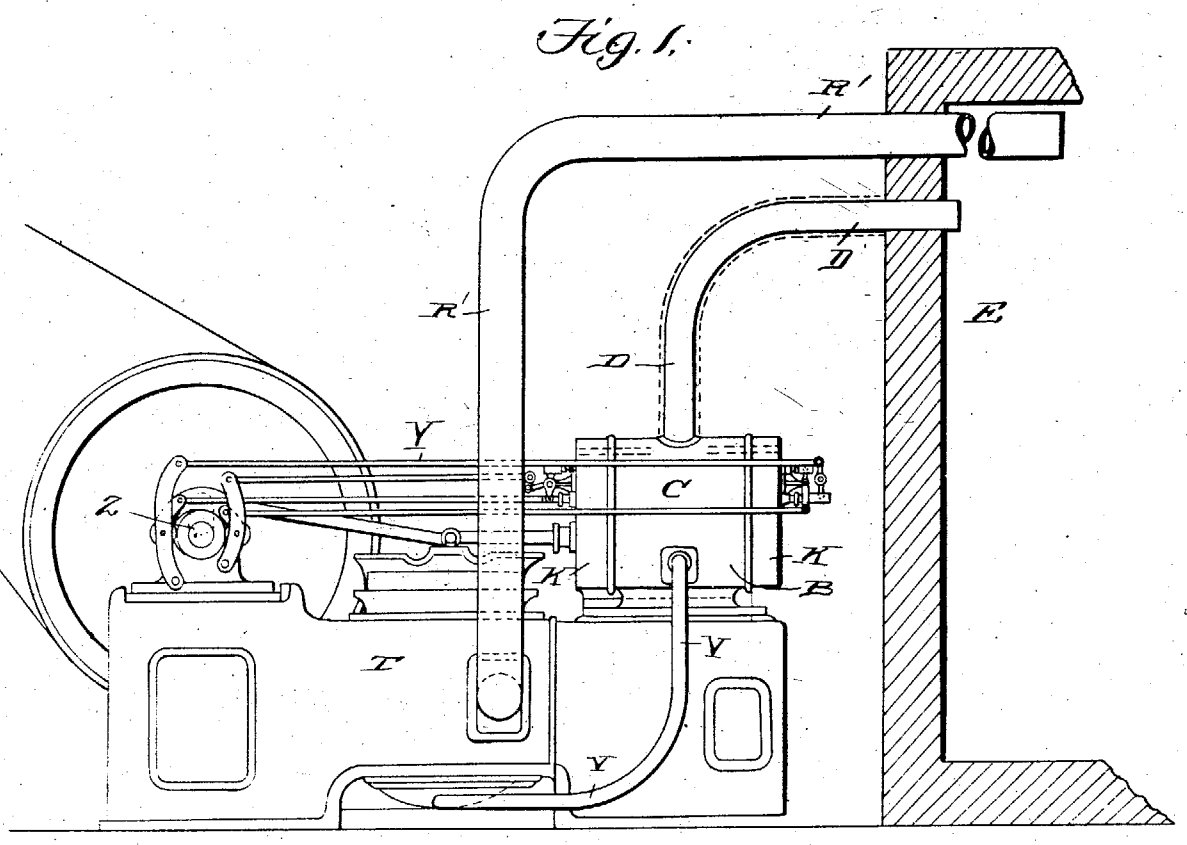
Figure 2:
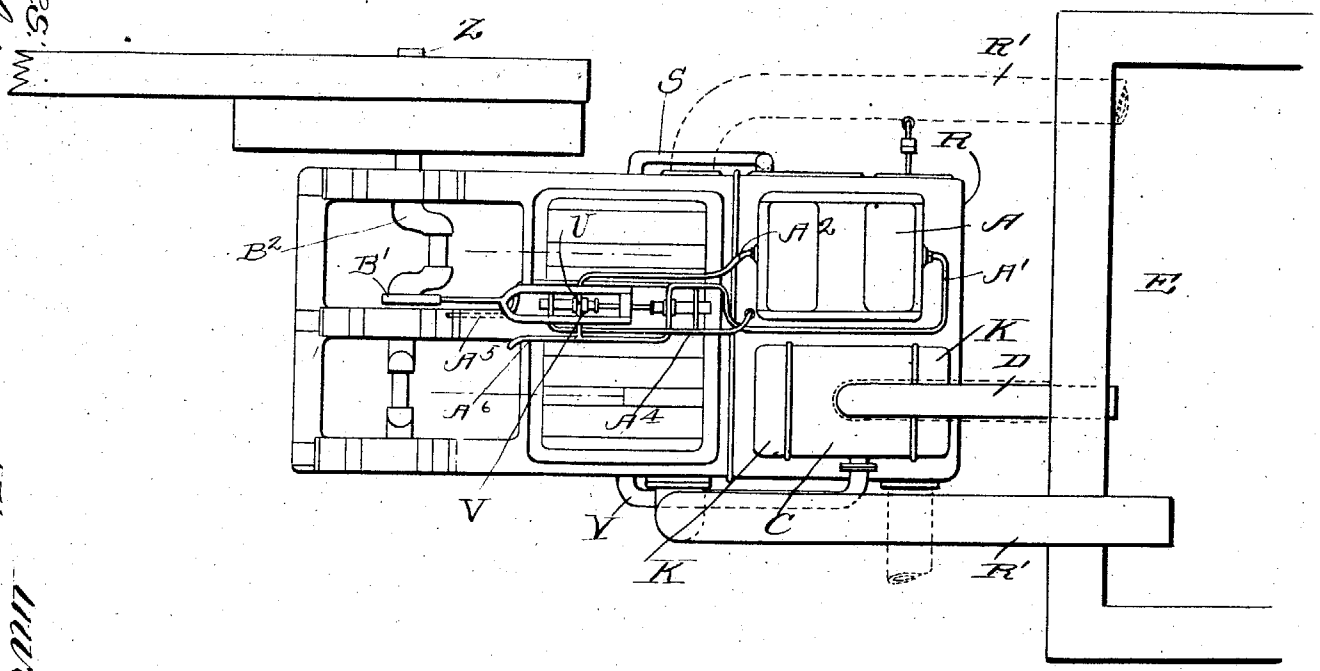
Figure 3:
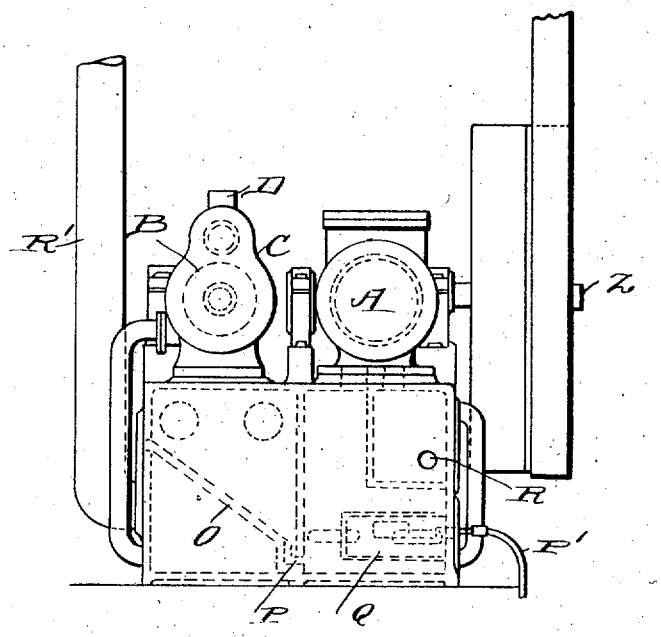
Figure 10:
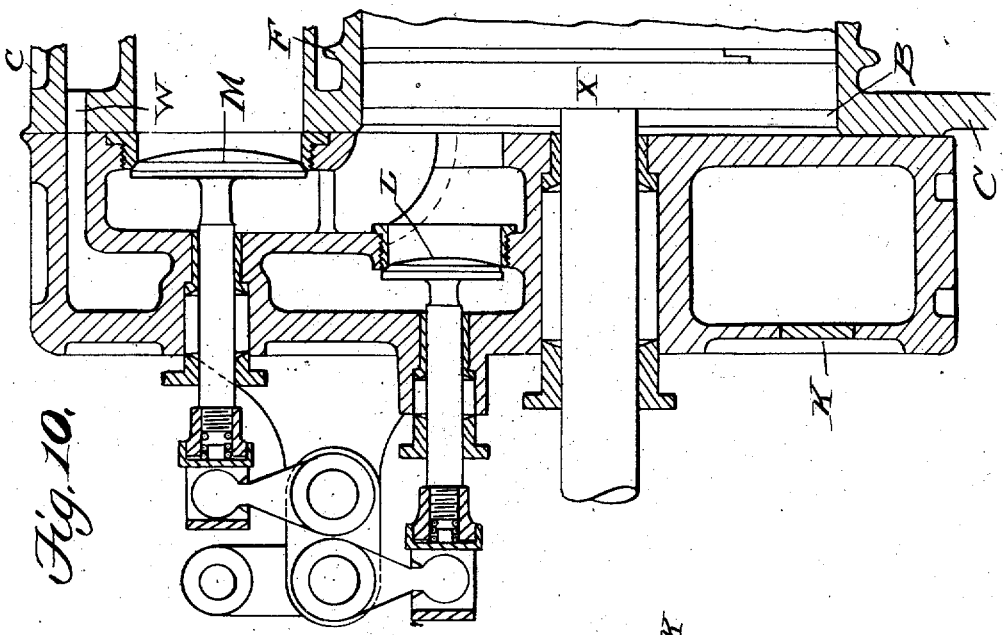
Figure 9:
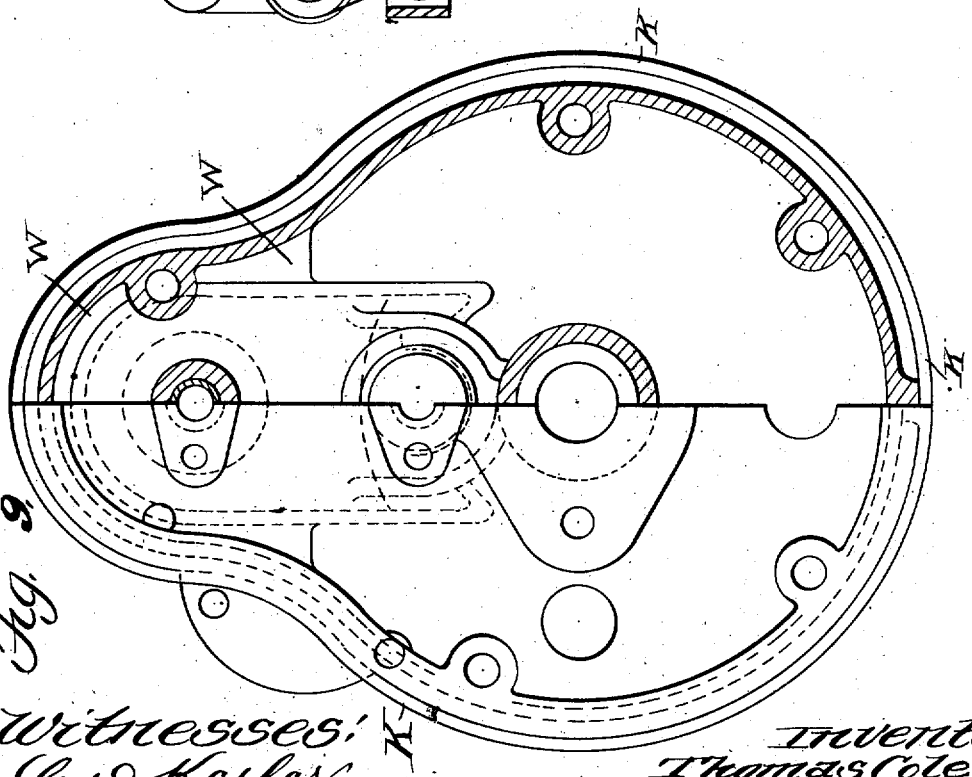

Figure 1 is a side elevation of a complete apparatus, showing the connection by pipes with a refrigerating-chamber. Fig. 2 is a plan of Fig. 1 with the valve-rods removed for sake of clearness. Fig. 3 is an end view of the apparatus. Fig. 4 is an elevation of the expansion-cylinder horizontally arranged, with its supporting box or casing in section, the compressed air first passing around the end portions of the cylinder and then around the center. Fig. 5 is a section on the line 1 1 of Fig. 4. Fig. 6 is a section on the line 2 2 of Fig. 4. Fig. 7 is an elevation of the expansion-cylinder horizontally arranged, with its supporting box or casing in section, the compressed air first passing around the center portion of the cylinder and then the outer or end part. Fig. 8 is a section through the line 3 3 of Fig. 7. Fig. 9 is a partial elevation; and Fig. 10 is a section of the valve-box, showing the valves in position.

For the purpose of this invention the compressed air from the compression-cylinder A (in which heat of compression is removed by the use of a cooling medium, as water, in or around the compression-cylinder) is passed either direct into an expansion-cylinder B or from the compression-cylinder through an auxiliary cooling device consisting of a chamber or column in which spheres or other obstructive media are placed; over which a current or spray of water is passed to break the inflowing air into fine streams for the purpose of extracting the heat of compression and a portion of the moisture and then to flow through tubes arranged in the same or a separate chamber, so that a further portion of the moisture is removed before it enters the jacketed or expansion cylinder B.

The expansion-cylinder B, as before stated, is jacketed, and this jacket C, in addition to encircling the cylinder, may also inclose a portion of or the whole of the pipe or pipes D, as shown in dotted lines in Figs. 1 and 2, which conduct the cold air from the expansion-cylinder B to the refrigerating-chamber E.

The outer wall of the expansion-cylinder B is provided with webs, ribs, fins, or other like projections F in ring or other form for creating a greater surface for contact of the compressed air to better extract any remaining moisture and render the air more efficient in its action, the space between the expansion-cylinder B and its jacket C being divided at various parts, as at G H, so that air in entering between the cylinder B and jacket C will diverge and pass completely, or nearly so, around the cylinder B at about its ends and then pass down into the lower portion or into a box or casing I, in which the cylinder B C is part of or may be supported, as at Figs. 4 and 7, division-plates G′ H′ being also provided to increase the travel of the air and cause a further deposit of moisture, and so that the air can pass through holes J in or under the division-plates G′ H′ and ascend and pass around the center portion of the expansion-cylinder and may also pass around the whole or a portion of the outlet pipe or pipes D before reaching the jacketed valve-chests K, arranged in the end or ends of the cylinder, for passing through the valve or valves L into the cylinder B and be then expanded and afterward forced into the refrigerating-chamber.

The box or casing or receiver-chamber I, upon which the expansion-cylinder may be supported or is part of, may have a sloping bottom O, provided with an outlet P, Fig. 3, so that all water extracted from the air by contact with the projections F of the cylinder B or jacket C can be passed into the automatic water-trap Q on the machine, a water seal only being necessary to prevent the air passing with the water, the water eventualty passing away by the pipe P′. By thus constructing the expansion-cylinder B all moisture must trickle down from the cylinder B and jacket C into the lower part or into the box or support I, and by its removal greater dryness and efficiency of the air are insured.

The travel of the air around the cylinder B may be in a way other than that above described, and should the cylinder be arranged vertically or anglewise the projections F and dividing-plates G H will be arranged accordingly to automatically drain away the water deposited from the air to a convenient place for drainage.

The box or casing I, forming part of or supporting the cylinder, may be part of the base or bed for supporting the whole of the air-cooling apparatus, thus insuring compactness.

As will be understood, the chief feature of novelty of the invention consists in providing the cylinder B or its jacket C with webs or fins arranged in such manner in relation to the position or construction of the expansion-cylinder that the compressed cold air is conducted around or along the cylinder in one or various directions, and at the same time, by reason of the webs or fins affording a greater surface for the attraction of the moisture or water contained in the compressed air, such moisture or water is completely extracted from the compressed air, which enters and leaves the expansion-cylinder in a perfectly dry condition, thus insuring a perfect working of the complete apparatus in consequence of all frost or snow (produced by the moisture) being uncreated, all blocking of the valves being thereby prevented.

According to the apparatus or plant shown by the annexed drawings in Figs. 1, 2, and 3 the air to be compressed is drawn into the compression-cylinder A, preferably through the opening R; but it may be drawn from the refrigerating-chamber E through the medium of the pipe R′, and during the compression of the air a spray of water is injected, as hereinafter described, into the cylinder A to mix with the air and absorb the heat of compression. When the compression of the air has taken place to a certain degree, the compressed air is expelled direct from the cylinder A to the jacketed expansion-cylinder B or through the pipe S into the auxiliary cooler or chamber T, in which spheres or other obstructive media are placed and over which a current or spray of water under pressure from the pump U through the pipe $A^4$ is passed to break the inflowing air into fine streams in the said auxiliary cooler or chamber T for the purpose of further extracting the heat of compression, the air then flowing through tubes also arranged within the chamber or column T and away to the expansion-cylinder B C by the pipe V, where it traverses the cylinder in the manner before described, according to the construction of such cylinder, the traveling cold air entering the valve box or boxes K by the channel or opening W, from which valve-box K the compressed air enters the expansion-cylinder through the valve L to be expelled on the return motion of the piston X through the valve M for passage by the pipe or pipes D to the refrigerating-chamber E for distribution therein. The valves of the expansion-cylinder are operated by any suitable arrangement of rods Y, actuated by cams or otherwise on the driving crank-shaft Z, which can obtain its motion from any prime mover.

The water injected and sprayed into the compression-cylinder to mix with the air for the purpose of absorbing the heat of compression and injected into the auxiliary cooler T to break the inflowing air into small streams is drawn from a spray-tank (not shown) through the medium of the pipes $A^5$ $A^6$, respectively, by the pump U, the latter being actuated by an eccentric B′ on the shaft $B^2$. The water is forced by the pump U through the spray-pipes A′ $A^2$ into each end of the compression-cylinder A, respectively, and into the auxiliary cooler T through the pipe $A^4$.

What we claim, and desire to secure by Letters Patent, is—

1. In an apparatus for producing cold air for refrigerating purposes and the like, an air-compressor, means for absorbing the heat of compression, an expansion-cylinder, a jacket surrounding the said expansion-cylinder, ribs between said jacket and said expansion-cylinder, a casing in communication with the said jacket to receive the air, partitions in said casing to increase the travel of the air, communication between said casing and said jacket for returning the air thereto, a valve mechanism for admitting air to said expansion-cylinder, and connections between the latter and a suitable refrigerator.

2. In an apparatus for producing cold air for refrigerating purposes and the like, an air-compressor, an auxiliary air-cooling device in communication therewith, a ribbed expansion-cylinder, a jacket surrounding the same, a casing in communication therewith and adapted to receive the air, partitions in said casing to increase the travel of the air, communication between said casing and jacket for returning the air thereto, means in said casing for collecting the moisture, a valve mechanism for admitting air to the expansion-cylinder, and connections between the latter and a refrigerator.

3. In an apparatus for producing cold air for refrigerating purposes and the like, an air-compressor, means for absorbing the heat of compression, an expansion-cylinder, a jacket surrounding the same, a moisture-collecting means interposed between said expansion-cylinder and said jacket, a casing in communication with said jacket and adapted to receive the air therefrom, partitions in said casing to increase the travel of the air, communication between said casing and jacket for returning the air thereto, a sloping bottom in said casing to receive the moisture from said means, a valve mechanism for admitting air to said expansion-cylinder, and a refrigerator in communication with said expansion-cylinder.

4. In an apparatus for producing cold air for refrigerating purposes, the combination with a suitable air-compressor and means for absorbing the heat of compression, of an expansion-cylinder, a jacket surrounding the said cylinder and in communication with said compressor, ribs interposed between said jacket and said expansion-cylinder, a casing in communication with said jacket and adapted to receive the air therefrom, means in the casing for increasing the travel of the air, communication between said casing and said jacket for returning the air thereto, a collecting means for the moisture arranged in said casing, and a valve mechanism for admitting air to said cylinder from said jacket.

In testimony whereof we have hereunto set our hands in presence of two subscribing witnesses.

THOMAS COLE.
WILLIAM LAWES COLE.

In presence of—
WILLIAM OSWALD BROWN,
IRENÊO FRANCISCO VELHO.